US011644981B2

(12) United States Patent
Meier et al.

(10) Patent No.: US 11,644,981 B2
(45) Date of Patent: May 9, 2023

(54) SEMICONDUCTOR DEVICES WITH SECURITY LOCK AND ASSOCIATED METHODS AND SYSTEMS

(71) Applicant: Micron Technology, Inc., Boise, ID (US)

(72) Inventors: Nathaniel J. Meier, Boise, ID (US); Brenton P. Van Leeuwen, Meridian, ID (US)

(73) Assignee: Micron Technology, Inc., Boise, ID (US)

(*) Notice: Subject to any disclaimer, the term of this patent is extended or adjusted under 35 U.S.C. 154(b) by 133 days.

(21) Appl. No.: 17/032,542

(22) Filed: Sep. 25, 2020

(65) Prior Publication Data
US 2022/0100397 A1 Mar. 31, 2022

(51) Int. Cl.
G06F 21/78 (2013.01)
G06F 21/71 (2013.01)
G06F 3/06 (2006.01)
G06F 21/82 (2013.01)

(52) U.S. Cl.
CPC ......... *G06F 3/0622* (2013.01); *G06F 3/0653* (2013.01); *G06F 3/0679* (2013.01); *G06F 21/78* (2013.01)

(58) Field of Classification Search
None
See application file for complete search history.

(56) References Cited

U.S. PATENT DOCUMENTS

| 9,870,293 | B2* | 1/2018 | Lee .......................... G11C 7/12 |
| 2013/0297831 | A1* | 11/2013 | Laurentiu ........... G06F 13/4282 710/5 |
| 2014/0137271 | A1 | 5/2014 | Hyde et al. |
| 2015/0242331 | A1* | 8/2015 | Van Winkelhoff ....... G11C 7/24 711/163 |
| 2015/0260801 | A1* | 9/2015 | Trent ..................... G01R 23/16 324/76.39 |
| 2015/0277790 | A1 | 10/2015 | Mozak et al. |

(Continued)

FOREIGN PATENT DOCUMENTS

| KR | 20160114662 A | 10/2016 |
| WO | 2020139534 A1 | 7/2020 |

OTHER PUBLICATIONS

Autonomous Car System using Facial Recognition and Geo Location Services. Faisal. IEEE. (Year: 2016).*

(Continued)

*Primary Examiner* — Venkat Perungavoor
(74) *Attorney, Agent, or Firm* — Perkins Coie LLP

(57) ABSTRACT

Memory devices, systems including memory devices, and methods of operating memory devices are described, in which security locks are implemented to control access to secure functions of the memory devices. In one embodiment, the memory device detects a predetermined signal directed to the memory device. The predetermined signals may include one or more commands directed to the memory device, an operating parameter of the memory device, or both. The memory device may track instances of the predetermined signals to compare with a threshold stored in the memory device. If the memory device determines that the predetermined signals satisfy the threshold, the memory device prohibits access to the secure functions.

10 Claims, 9 Drawing Sheets

(56) References Cited

U.S. PATENT DOCUMENTS

| | | | |
|---|---|---|---|
| 2017/0147230 A1* | 5/2017 | Lee | G06F 12/02 |
| 2017/0185499 A1* | 6/2017 | Lee | G11C 29/84 |
| 2019/0115083 A1* | 4/2019 | Lee | G11C 11/5642 |
| 2019/0259429 A1* | 8/2019 | Heo | G11C 11/413 |
| 2020/0026475 A1* | 1/2020 | Yang | G06F 3/0604 |
| 2020/0174948 A1 | 6/2020 | Morrison et al. | |
| 2020/0210110 A1 | 7/2020 | Richter et al. | |
| 2021/0272617 A1* | 9/2021 | Kang | G11C 11/4085 |
| 2022/0028460 A1* | 1/2022 | Kurose | G06F 3/0679 |

OTHER PUBLICATIONS

Instruction-Level Abstraction (ILA): A Uniform Specification for System-on-Chip (SoC) Verification. Huang. ACM. (Year: 2018).*
Defense-in-depth: A recipe for logic locking to prevail. Rahman. Elsevier. (Year: 2020).*
SGX-Bomb: Locking Down the Processor via Rowhammer Attack. Jang. ACM. (Year: 2017).*
International Application No. PCT/US2021/048356—International Search Report and Written Opinion, dated Dec. 16, 2021, 10 pages.

* cited by examiner

SEMICONDUCTOR DEVICES WITH SECURITY LOCK AND ASSOCIATED METHODS AND SYSTEMS

TECHNICAL FIELD

The present disclosure generally relates to semiconductor devices, and more particularly relates to semiconductor devices with security locks and associated methods and systems.

BACKGROUND

Memory devices are widely used to store information related to various electronic devices such as computers, wireless communication devices, cameras, digital displays, and the like. Memory devices are frequently provided as internal, semiconductor, integrated circuits and/or external removable devices in computers or other electronic devices. There are many different types of memory, including volatile and nonvolatile memory. Volatile memory, including random-access memory (RAM), static random-access memory (SRAM), dynamic random-access memory (DRAM), and synchronous dynamic random-access memory (SDRAM), among others, require a source of applied power to maintain its data. Nonvolatile memory, by contrast, can retain its stored data even when not externally powered. Nonvolatile memory is available in a wide variety of technologies, including flash memory (e.g., NAND and NOR), phase change memory (PCM), ferroelectric random-access memory (FeRAM), resistive random-access memory (RRAM), and magnetic random-access memory (MRAM), among others. Improving memory devices, generally, may include increasing memory cell density, increasing read/write speeds or otherwise reducing operational latency, increasing reliability, increasing data retention, reducing power consumption, or reducing manufacturing costs, among other metrics.

BRIEF DESCRIPTION OF THE DRAWINGS

The present disclosure will be understood more fully from the detailed description given below and from the accompanying drawings of various embodiments of the disclosure. The components in the drawings are not necessarily to scale. Instead, emphasis is placed on illustrating clearly the principles of the present technology.

DETAILED DESCRIPTION

Figure 1:
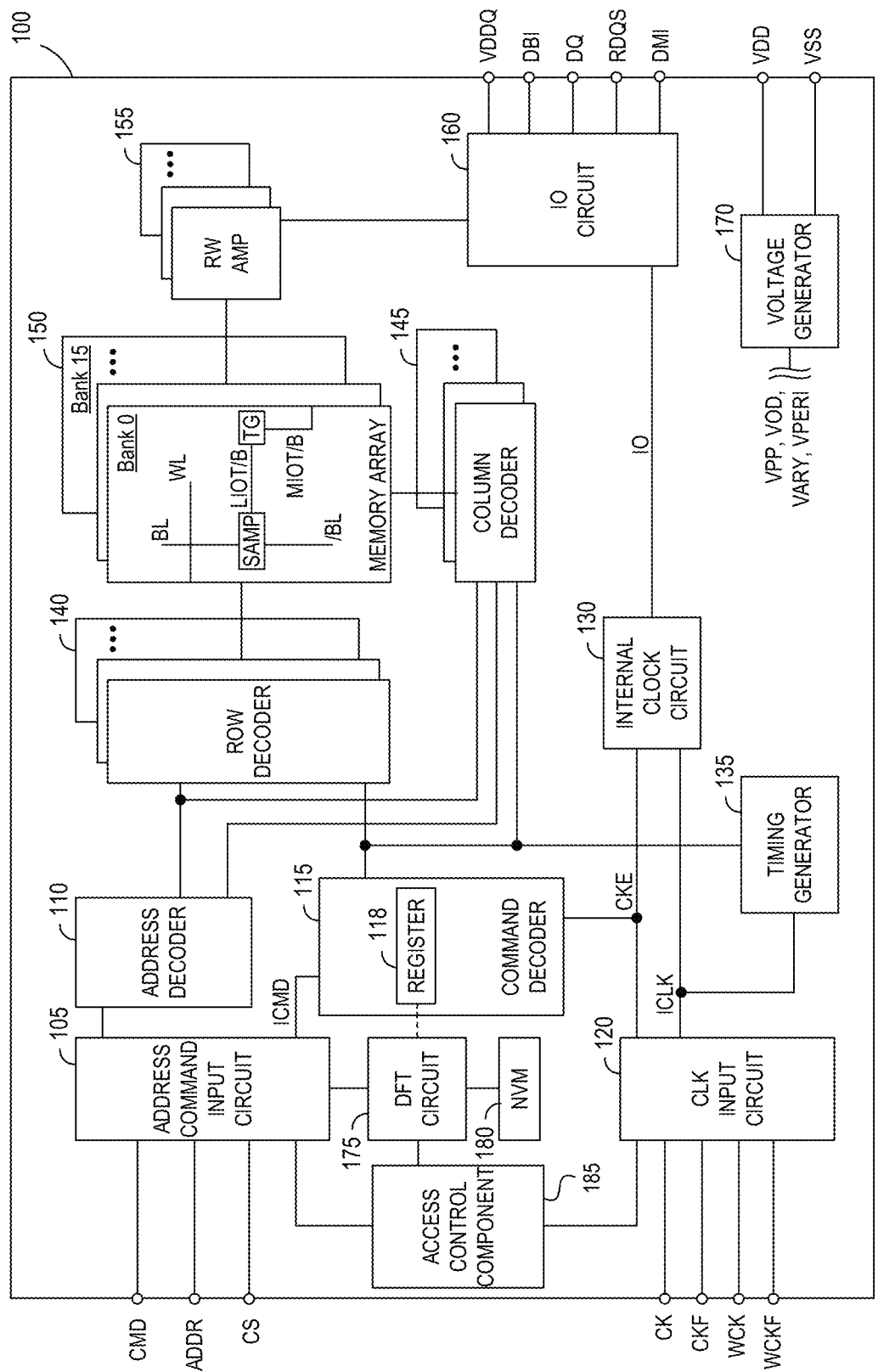
FIG. 1 is a block diagram schematically illustrating a memory device in accordance with embodiments of the present technology.

Methods, systems, and apparatuses for memory devices (e.g., DRAM) are disclosed, which provide for security locks to secure features of the memory devices. A memory device may support various operational features. Some of the operational features may be described in a specification of the memory device such that an end-user of the memory device may utilize the operational features described in the specification. In addition, the memory device may be configured to support special operational features that would require controlled access, which may be collectively referred to as secure features and/or secure functions. Such secure features (or secure functions) may include various design-for-test (DFT) functions (which may also be referred to as design-for-manufacturing (DFM) functions). In some embodiments, the DFT functions (which may be referred to as DFT modes or test modes) include vendor-specific features or functions (e.g., test modes that are accessible only by the manufacture of the memory device), customized features or functions (e.g., certain test modes, special capabilities) that may be activated for selected customers or a selected set of memory devices, or the like. In some cases, the DFT modes (or test modes) include accessing nonvolatile memory (NVM) elements of the memory device—e.g., storing (programming) special operating conditions, reading various operating conditions for performing certain test mode functions.

The DFT functions (e.g., special functions under the test modes) may provide flexibility to modify operational characteristics of the memory device without implementing permanent changes to the memory device design. For example, the DFT functions may facilitate the memory device to perform certain operations temporarily under the test mode to evaluate feasibility of the operations. In some cases, the DFT functions may program non-volatile memory elements of the memory devices (e.g., a fuse array) such that a special capability can be enabled as a default for certain customers. In other examples, the DFT (or DFM) functions may selectively configure the memory device to operate pursuant to certain customer requirements—e.g., a customer requiring ×4 memory devices while another customer requiring ×8 memory devices.

The DFT functions, however, can be abused by unauthorized or hostile actors to permanently damage the memory device or degrade the memory device in undesirable ways. For example, the memory device may store various operational information in the nonvolatile memory elements, which the memory device needs to retain without power. The operational information stored in the nonvolatile memory elements may include critical information associated with the secure features (e.g., DFT functions, entries to the test modes and/or special capabilities) and/or other conditions for the memory device to operate, such as trim settings, redundancy implementations, optimal timing/biasing parameters, among others. Further, some of the nonvolatile memory elements (e.g., fuses, anti-fuses, blown capacitor devices, transistors with blown gate-oxide) are regarded as one-time programmable memory cells due to their irreversible programming characteristics. Thus, access to the nonvolatile memory elements may permit hostile or inadvertent actors to permanently alter the critical information, which in turn, can result in harmful consequences to the performance or functionality of the memory device.

In some embodiments, a memory device is configured to allow a customer (e.g., an authentic end-user) to select and store a user-defined access key in a nonvolatile memory element of the memory device. After the customer establishes the user-defined access key, the memory device may control accesses to the secure features based on the user-defined access key stored in a nonvolatile memory component. Features of such embodiments are also described in a pending U.S. application Ser. No. 16/677,478 filed on Nov. 7, 2019, and incorporated in its entirety herein by reference. In some embodiments, a manufacturer may establish an access key based on a unique identification (or identifier) of a memory device—e.g., based on manufacturing information of the memory device, such that the memory device may permit selected end-users to access the secure features, those who can present the access key based on the unique identification. Features of such embodiments are also described in a pending U.S. application Ser. No. 16/677,286 filed on Nov. 7, 2019, and incorporated in its entirety herein by reference.

In some embodiments, a manufacturer may define access keys for memory devices, and establish predetermined sequences of signals (e.g., a sequence of two or more commands) to release the access keys to selected end-users only, upon receiving the sequences of signals at the memory devices. After receiving the access key by presenting the predetermined sequence of signals to the memory device, the end-user may access the secure features of the memory device. Features of such embodiments are also described in a pending U.S. application Ser. No. 16/677,376 filed on Nov. 7, 2019, and incorporated in its entirety herein by reference. In some embodiments, a manufacture may allow an end-user to access the secure features of the memory devices upon completing certain procedures related to activating the memory devices—e.g., a power-up procedure. Subsequently, the memory devices can prohibit (e.g., lock) accesses to the secure features if certain conditions are satisfied—e.g., a time elapsed after a triggering event, execution of one or more pre-identified commands, programming certain mode registers, etc. Features of such embodiments are also described in a pending U.S. application Ser. No. 16/677,486 filed on Nov. 7, 2019, and incorporated in its entirety herein by reference.

The present technology provides for various schemes for locking (or re-locking) the secure features (secure functions) after accesses to the secure features have been granted as described in the pending U.S. Applications. Such locking schemes, in conjunction with the authenticated access, may be beneficial for temporarily allowing a customer to access the secure features, and subsequently preventing the customer from accessing the secure features. For example, after the memory devices have been released to the field, updates and/or revisions to firmware of the memory devices can be accomplished by allowing the customer to access the secure features. Subsequently, once such updates and/or revisions are completed by the customer, the present technology can lock (re-lock) the secure features such that the customer can no longer access the secure features.

A memory device that supports embodiments of the present technology is described with reference to FIG. 1. More detailed block diagrams of various components for illustrating the security locks for the secure features in accordance with embodiments of the present technology are provided with reference to FIGS. 2A and 2B. FIGS. 3A through 3C describe conceptual timing diagrams for the security locks in accordance with embodiments of the present technology. Flowcharts illustrating the security locks in accordance with embodiments of the present technology are described with reference to FIGS. 4A through 4C. A memory system that supports embodiments of the present technology is described with reference to FIG. 5. A flowchart illustrating methods of operating the memory devices in accordance with embodiments of the present technology is described with reference to FIG. 6.

FIG. 1 is a block diagram schematically illustrating a memory device 100 in accordance with an embodiment of the present technology. The memory device 100 may include an array of memory cells, such as memory array 150. The memory array 150 may include a plurality of banks (e.g., banks 0-15 in the example of FIG. 1), and each bank may include a plurality of word lines (WL), a plurality of bit lines (BL), and a plurality of memory cells (e.g., m×n memory cells) arranged at intersections of the word lines (e.g., m word lines, which may also be referred to as rows) and the bit lines (e.g., n bit lines, which may also be referred to as columns). Memory cells can include any one of a number of different memory media types, including capacitive, phase change, magnetoresistive, ferroelectric, or the like. The selection of a word line WL may be performed by a row decoder 140, and the selection of a bit line BL may be performed by a column decoder 145. Sense amplifiers (SAMP) may be provided for corresponding bit lines BL and connected to at least one respective local I/O line pair (LIOT/B), which may in turn be coupled to at least respective one main I/O line pair (MIOT/B), via transfer gates (TG), which can function as switches. The memory array 150 may also include plate lines and corresponding circuitry for managing their operation.

The memory device 100 may employ a plurality of external terminals that include command and address terminals coupled to a command bus and an address bus to receive command signals CMD and address signals ADDR, respectively. The memory device may further include a chip select terminal to receive a chip select signal CS, clock terminals to receive clock signals CK and CKF, data clock terminals to receive data clock signals WCK and WCKF, data terminals DQ, RDQS, DBI, and DMI, power supply terminals VDD, VSS, VDDQ, and VSSQ.

The command terminals and address terminals may be supplied with an address signal and a bank address signal from outside. The address signal and the bank address signal supplied to the address terminals can be transferred, via a command/address input circuit 105, to an address decoder 110. The address decoder 110 can receive the address signals and supply a decoded row address signal (XADD) to the row decoder 140 (which may be referred to as a row driver), and a decoded column address signal (YADD) to the column decoder 145 (which may be referred to as a column driver). The address decoder 110 can also receive the bank address signal (BADD) and supply the bank address signal to both the row decoder 140 and the column decoder 145.

In some embodiments, the command/address input circuit 105 is coupled with a DFT circuit 175 (which may be referred to as a test mode (TM) control circuit) and transmit commands directed to various DFT functions to the DFT circuit 175. Further, the command/address input circuit 105 may be coupled with an access control component 185 that is coupled with the DFT circuit 175. The access control component 185 may prohibit (or allow) access to the DFT circuit 175 if a certain condition is satisfied (or unsatisfied) such that the memory device 100, in conjunction with the access control component 185, can block unauthorized accesses (or allow authenticated accesses) to its secure features. As such, the access control component 185 provides security locks for the special features that the DFT circuit 175 performs under test modes.

The DFT circuit 175 may perform various DFT functions (e.g., test mode functions) that are defined by a manufacturer of the memory device 100. Such test mode functions may be used only by the manufacturer, not by a customer (e.g., an entity purchasing the memory devices) unless authenticated by the memory device 100. The DFT circuit 175 may be coupled to one or more registers 118 of the memory device 100. In some cases, the DFT circuit 175 may read the registers 118 to determine specific test mode functions to perform, based on information stored in the registers 118. In other cases, the DFT circuit 175 may store information in the registers 118 such that other functional blocks of the memory device 100 may perform appropriate functions based on the information (e.g., information related to various test modes or DFT functions) stored in the registers 118.

The DFT circuit 175 may be coupled with a nonvolatile memory (NVM) element 180. The NVM element 180 can include an array of fuses that may be considered as one-time programmable nonvolatile memory elements. In some embodiments, the NVM element 180 may include metal switches, blown capacitor devices, transistors with blown gate-oxide, NAND memory cells, PCM cells, magnetic memory cells, or the like. The NVM element 180 may be configured to store various operational information for the memory device 100, such as trim setting conditions including specific timing and/or voltage parameters, read/write clock conditions based on the read/write timing outcomes, control bits to enable or disable customer specific features or functionality, redundancy implementation information used for repairing a portion of the memory array 150, among others.

The command and address terminals may be supplied with command signals CMD, address signals ADDR, and chip selection signals CS, from a memory controller. The command signals may represent various memory commands from the memory controller (e.g., including access commands, which can include read commands and write commands). The select signal CS may be used to select the memory device 100 to respond to commands and addresses provided to the command and address terminals. When an active CS signal is provided to the memory device 100, the commands and addresses can be decoded and memory operations can be performed. The command signals CMD may be provided as internal command signals ICMD to the command decoder 115 via the command/address input circuit 105. The command decoder 115 may include circuits to decode the internal command signals ICMD to generate various internal signals and commands for performing memory operations, for example, a row command signal to select a word line and a column command signal to select a bit line. The internal command signals can also include output and input activation commands, such as clocked command CMDCK.

The command decoder 115, in some embodiments, may include one or more registers 118 for tracking various counts and/or values (e.g., counts of refresh commands received by the memory device 100 or self-refresh operations performed by the memory device 100) and/or for storing various operating conditions for the memory device 100 to perform certain functions (e.g., DFT functions, functions under test modes), features, and modes (e.g., test modes). As such, in some embodiments, the registers 118 (or a subset of the registers 118) may be referred to as mode registers. Additionally, or alternatively, the memory device 100 may include registers 118 as a separate component out of the command decoder 115. In some embodiments, the registers 118 may include multi-purpose registers (MPRs) configured to write and/or read specialized data for the memory device 100.

When a read command is issued and a row address and a column address are timely supplied with the read command, read data can be read from memory cells in the memory array 150 designated by these row address and column address. The read command may be received by the command decoder 115, which can provide internal commands to input/output circuit 160 so that read data can be output from the data terminals DQ, RDQS, DBI, and DMI via read/write amplifiers 155 and the input/output circuit 160 according to the RDQS clock signals. The read data may be provided at a time defined by read latency information RL that can be programmed in the memory device 100, for example, in a mode register (not shown in FIG. 1). The read latency information RL can be defined in terms of clock cycles of the CK clock signal. For example, the read latency information RL can be a number of clock cycles of the CK signal after the read command is received by the memory device 100 when the associated read data is provided.

When a write command is issued and a row address and a column address are timely supplied with the command, write data can be supplied to the data terminals DQ, DBI, and DMI according to the WCK and WCKF clock signals. The write command may be received by the command decoder 115, which can provide internal commands to the input/output circuit 160 so that the write data can be received by data receivers in the input/output circuit 160, and supplied via the input/output circuit 160 and the read/write amplifiers 155 to the memory array 150. The write data may be written in the memory cell designated by the row address and the column address. The write data may be provided to the data terminals at a time that is defined by write latency WL information. The write latency WL information can be programmed in the memory device 100, for example, in the mode register (not shown in FIG. 1). The write latency WL information can be defined in terms of clock cycles of the CK clock signal. For example, the write latency information WL can be a number of clock cycles of the CK signal after the write command is received by the memory device 100 when the associated write data is received.

The power supply terminals may be supplied with power supply potentials VDD and VSS. These power supply potentials VDD and VSS can be supplied to an internal voltage generator circuit 170. The internal voltage generator circuit 170 can generate various internal potentials VPP, VOD, VARY, VPERI, VPOP, and the like based on the power supply potentials VDD and VSS. The internal potential VPP can be used in the row decoder 140, the internal potentials VOD and VARY can be used in the sense amplifiers included in the memory array 150, and the internal potential VPERI can be used in many other circuit blocks. In some embodiments, the internal potential VPOP may be utilized to provide a common internal potential (e.g., internal voltage source) for various circuits and components related to performing the test mode functions, which may be referred to as a super voltage (SV). As such, controlled access to the secure features may be implemented through controlled access to the super voltage and/or by monitoring the super voltage.

The power supply terminal may also be supplied with power supply potential VDDQ. The power supply potential VDDQ can be supplied to the input/output circuit 160 together with the power supply potential VSS. The power supply potential VDDQ can be the same potential as the power supply potential VDD in an embodiment of the present technology. The power supply potential VDDQ can be a different potential from the power supply potential VDD in another embodiment of the present technology. However, the dedicated power supply potential VDDQ can be used for the input/output circuit 160 so that power supply noise generated by the input/output circuit 160 does not propagate to the other circuit blocks.

The clock terminals and data clock terminals may be supplied with external clock signals and complementary external clock signals. The external clock signals CK, CKF, WCK, WCKF can be supplied to a clock input circuit 120. The CK and CKF signals can be complementary, and the WCK and WCKF signals can also be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level.

Input buffers included in the clock input circuit 120 can receive the external clock signals. For example, when enabled by a CKE signal from the command decoder 115, an input buffer can receive the CK and CKF signals and the WCK and WCKF signals. The clock input circuit 120 can receive the external clock signals to generate internal clock signals ICLK. The internal clock signals ICLK can be supplied to an internal clock circuit 130. The internal clock circuit 130 can provide various phase and frequency controlled internal clock signal based on the received internal clock signals ICLK and a clock enable signal CKE from the command/address input circuit 105. For example, the internal clock circuit 130 can include a clock path (not shown in FIG. 1) that receives the internal clock signal ICLK and provides various clock signals to the command decoder 115. The internal clock circuit 130 can further provide input/output (IO) clock signals. The IO clock signals can be supplied to the input/output circuit 160 and can be used as a timing signal for determining an output timing of read data and the input timing of write data. The IO clock signals can be provided at multiple clock frequencies so that data can be output from and input to the memory device 100 at different data rates. A higher clock frequency may be desirable when high memory speed is desired. A lower clock frequency may be desirable when lower power consumption is desired. The internal clock signals ICLK can also be supplied to a timing generator 135 and thus various internal clock signals can be generated.

The memory device 100 can be connected to any one of a number of electronic devices capable of utilizing memory for the temporary or persistent storage of information, or a component thereof. For example, a host device of memory device 100 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device may be a networking device (e.g., a switch, a router, etc.) or a recorder of digital images, audio and/or video, a vehicle, an appliance, a toy, or any one of a number of other products. In one embodiment, the host device may be connected directly to memory device 100, although in other embodiments, the host device may be indirectly connected to memory device (e.g., over a networked connection or through intermediary devices).

In some embodiments, the memory device 100 can detect a predetermined signal directed to the memory device 100. The predetermined signal (e.g., related to predefined events associated with the memory device 100) may be command based (e.g., predetermined commands repeated more than a threshold number of times), time-periods based (e.g., expiration of predetermined durations), and/or external pin based (e.g., input voltage at a dedicated pin of the memory device 100), among others. Subsequently, the memory device 100 can determine that the predetermined signal satisfies a threshold stored in the memory device 100 such that the memory device 100, in conjunction with the access control component 185, can prohibit access to the DFT circuit 175 of the memory device 100.

Figure 2A:
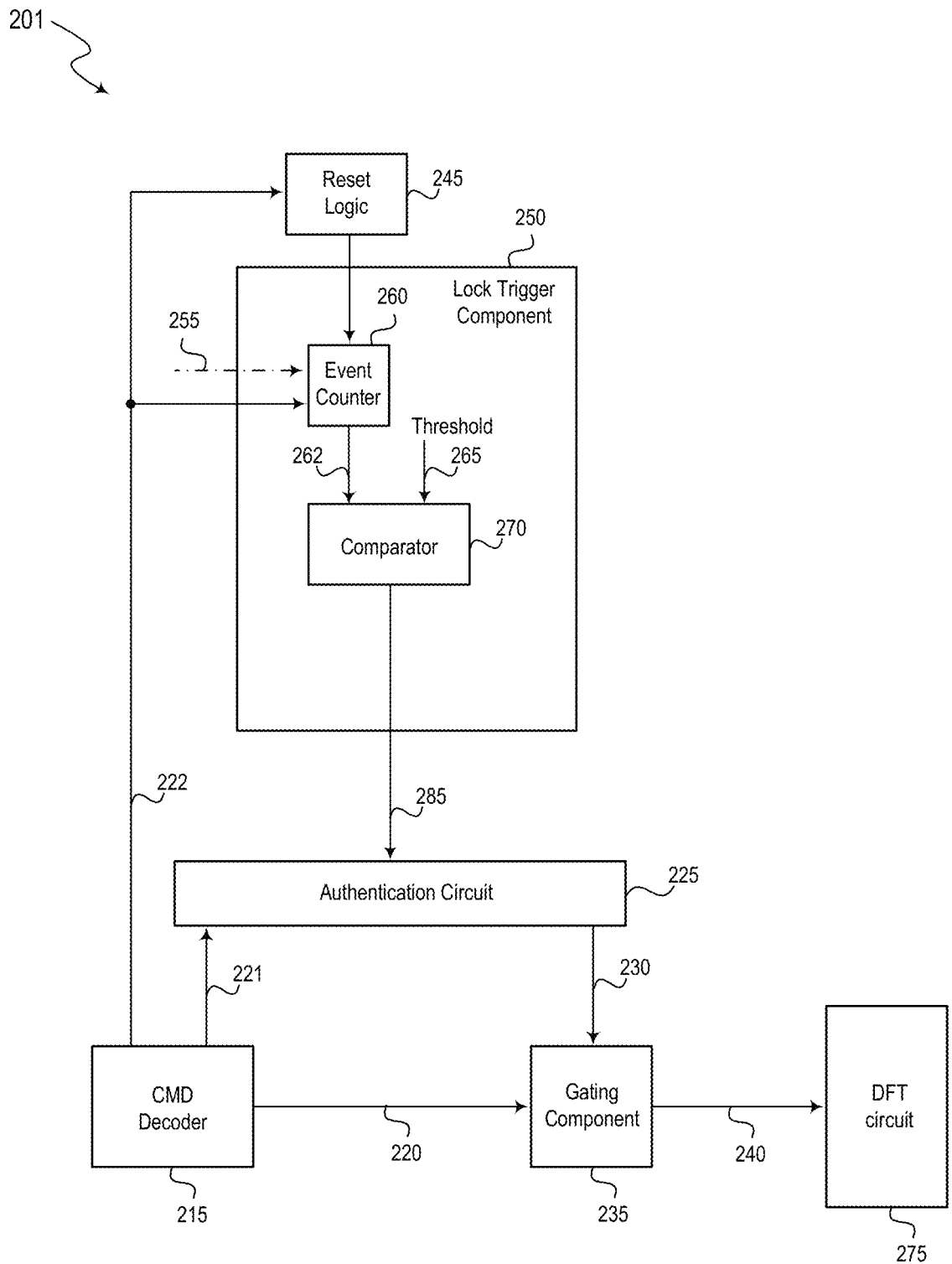
FIGS. 2A and 2B are block diagrams schematically illustrating an access control component of a memory device for providing security locks in accordance with embodiments of the present technology.
Figure 3A:
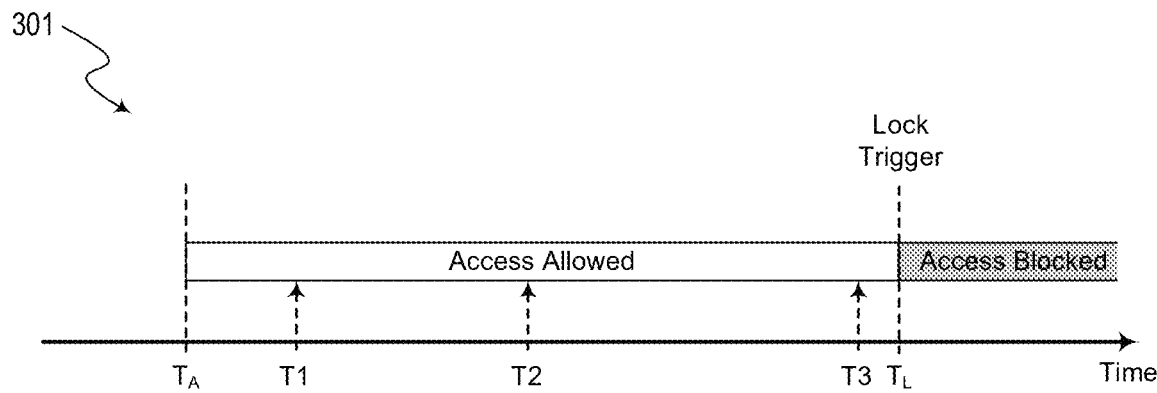
FIGS. 3A through 3C are conceptual timing diagrams illustrating security locks for memory devices in accordance with embodiments of the present technology.
Figure 3B:
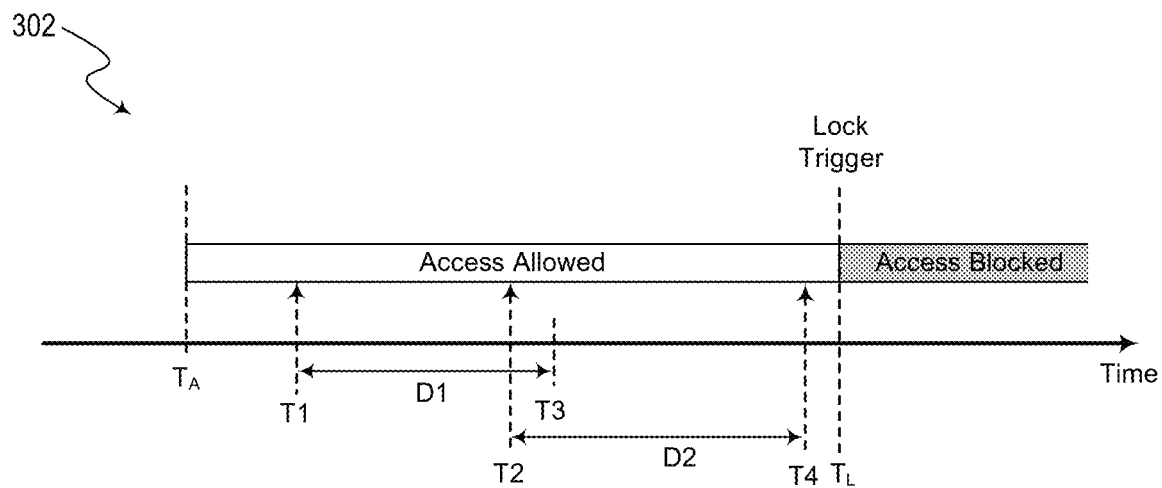
Figure 3C:
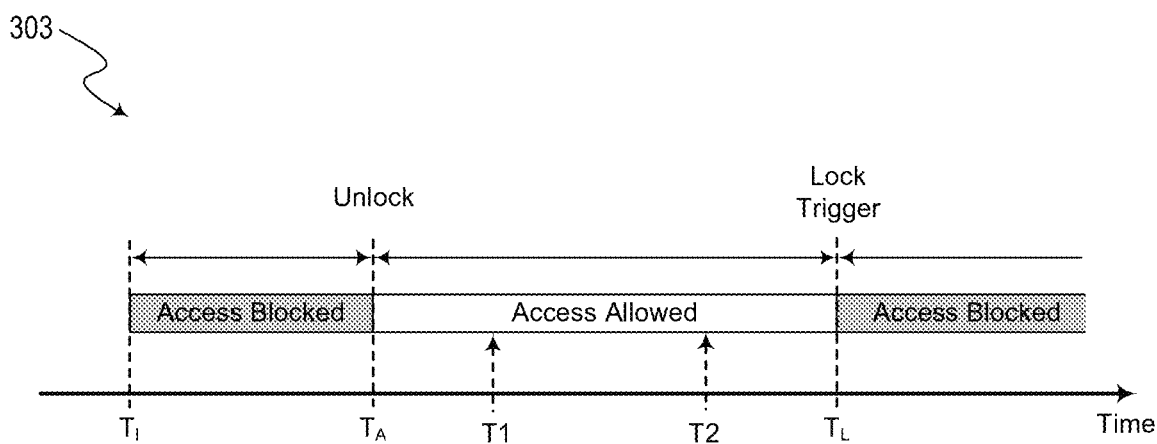

FIG. 2A is a block diagram 201 schematically illustrating an access control component (e.g., the access control component 185) of a memory device (e.g., the memory device 100), which provides security locks for secure features of the memory device in accordance with embodiments of the present technology. The access control component of the diagram 201 includes an authentication circuit 225, a gating component 235, a reset logic 245, and a lock trigger component 250 having an event counter 260 and a comparator 270. Further, the access control component is coupled with a DFT circuit 275 and a command decoder 215.

The DFT circuit 275 may be an example of or include aspects of the DFT circuit 175 described with reference to FIG. 1. As such, the DFT circuit 275 may perform various DFT functions and/or test mode functions of the memory device as described herein.

The command decoder 215 may be an example of or include aspects of the command decoder 115 described with reference to FIG. 1. For example, the command decoder 215 may decode commands received from a host device (e.g., a memory controller). Subsequently, the command decoder 215 may transmit (or relay) commands directed to the DFT functions (e.g., a test mode command) to the DFT circuit 275 using a signal 220 through the gating component 235. In some embodiments, the command decoder 215 may also transmit access keys accompanying the commands directed to the DFT functions to the authentication circuit 225 using a signal 221. Further, the command decoder 215 may transmit the commands received from the host device to the event counter 260 of the lock trigger component 250 using a signal 222. The command transmitted to the event counter 260 using the signal 222 may include commands directed to the DFT functions and/or commands directed to other functions of the memory device (e.g., normal mode commands), such as read commands, write commands, precharge commands, activate commands, refresh commands, mode register read (MRR) commands, or the like. Further, the command decoder 215 may transmit the commands received from the host device to the reset logic 245 using the signal 222.

The access control component may monitor for a predetermined signal directed to the memory device (e.g., using the event counter 260), where the predetermined signal includes commands directed to the memory device and/or operating parameters of the memory device. In some cases, the predetermined signals may be referred to as predefined events associated with the memory device. The event counter 260 may be updated based on detecting the predetermined signal. For example, the event counter 260 may store a quantity (or a value) that tracks instances of the predetermined signal. Such a quantity may increase as the instances of the predetermined signals occur—e.g., a count-up scheme. Similarly, the quantity may be set to a predetermined value and then, decrease as the instances of the predetermined signals occur—e.g., a count-down scheme. The event counter 260 may transmit a signal 262 to the comparator 270. The signal 262 may include one or more bits corresponding to a value of the event counter 260 (e.g., the value that tracks the instances of the predetermined signal). Further, the access control component may determine that the value of the event counter 260 satisfies a threshold 265 (e.g., using the comparator 270) stored in the memory device.

The comparator 270 may compare the value of the event counter 260 with the threshold 265 and generate a signal 285 configured to indicate that the value satisfies the threshold 265—e.g., the value of the event counter 260 being less than, less than or equal to, greater than, greater than or equal to, or equal to the threshold 265. In some embodiments, the threshold 265 may be stored in an NVM element (e.g., the NVM element 180) of the memory device. As described in more detail herein, the threshold 265 may correspond to quantities of the instances of the predetermined signals (e.g., certain commands repeated a threshold number of times), predetermined periods of time, indications directed to certain operating conditions (e.g., changes in voltage levels at certain nodes of the memory device, predetermined ranges of voltage levels at one or more dedicated pins of the memory device), or the like.

In some embodiments, the reset logic 245 resets the value that tracks instances of the predetermined signal in response to receiving the signal 222 corresponding to one of certain predetermined commands. For example, as described in more detail with reference to FIG. 3B, if the command received via the signal 222 corresponds to one of certain predetermined commands (e.g., a command programming the NVM element), the reset logic 245 may reset the value of the event counter 260 to renew a fixed time period, during which accessing the secure functions is permitted.

The authentication circuit 225 may authenticate commands directed to the DFT circuit 275 based on the access keys accompanying the commands—e.g., the access keys transmitted using the signal 221 from the command decoder 215. For example, the authentication circuit 225 may validate (or invalidate) a first access key accompanying the commands directed to the DFT circuit 275 by comparing the first access key transmitted to the authentication circuit 225 using the signal 221 with a second key stored in an NVM element of the memory device (e.g., the NVM element 180). The authentication circuit 225 can permit execution of the commands directed to the DFT circuit 275 based on the first access key matching the second access key—e.g., through the gating component 235 transmitting a signal 240 to the DFT circuit 275. Similarly, the authentication circuit 225 can prohibit the commands from accessing the DFT circuit 275 by transmitting a signal 230 to the gating component 235—e.g., if the first access key does not match the second access key. Various example embodiments and features of the authentication circuit 225 are described in more detail in the above-identified pending U.S. Applications.

Further, the authentication circuit 225 may receive the signal 285 from the comparator 270 of the lock trigger component 250. As described above, the signal 285 may indicate that the quantity of the instances of the predetermined signals is greater than or equal to the threshold—thus, triggering (activating) the security lock for the DFT circuit 275. As such, the authentication circuit 225 may transmit the signal 230 to the gating component 235 in response to receiving the signal 285 from the lock trigger component 250, in which the signal 230 may be configured to activate the gating component 235—e.g., to prohibit the command from reaching the DFT circuit 275.

The gating component 235 may prohibit, if activated by the signal 230, the command (e.g., the command transmitted toward the DFT circuit 275 using the signal 220) from accessing the DFT circuit 275 (e.g., by omitting to transmit a signal 240 to the DFT circuit 275), in response to receiving the signal 230 from the authentication circuit 225. As described above, the authentication circuit 225 may transmit the signal 230 in response to receiving the signal 285 from the comparator 270 of the lock trigger component 250. The gating component 235 may be referred to as a pass gate in some cases, in which the signal 230 may be configured to disable the pass gate to prohibit the command from reaching the DFT circuit 275. In this manner, the access control component may prohibit access to the DFT circuit 275 if certain conditions are met—e.g., the lock trigger component 250 determining that the predetermined signals has satisfied the threshold 265, the authentication circuit 225 transmitting signals to activate the gating component 235, and the gating component 235 blocking the commands from reaching the DFT circuit 275.

In some embodiments, the predetermined signals may correspond to one or more commands directed to the memory device. For example, such commands includes one or more commands directed to a memory array (e.g., the memory array 150) of the memory device, one or more commands directed to the DFT circuit 275, a command directed to a register (e.g., the register 118) of the memory device, or a combination thereof. The access control component may monitor such commands using the event counter 260 of the lock trigger component 250 coupled to the command decoder 215.

In certain instances, the predetermined signal may correspond to a single command, e.g., a command from a host device indicating that the host device no longer needs to access the DFT circuit 275, a command clearing the super voltage (SV) coupled to the DFT circuit 275, etc. Also, the threshold 265 may correspond to one (1)—e.g., if the lock trigger component 250 is configured to monitor a single instance of such commands—e.g., the single command indicating the host device no longer needs to access the DFT circuit 275 or the single command clearing the SV. In other instances, the predetermined signal may correspond to two or more commands—e.g., three (3) commands accessing the NVM element (e.g., programming the fuse array). Also, the threshold 265 may correspond to one (1)—e.g., if the lock trigger component 250 is configured to block additional access to the DFT circuit 275 after the host device programs the fuse array three (3) times. Similarly, the threshold 265 may correspond to two (2)—e.g., if the lock trigger component 250 is configured to block additional access to the DFT circuit 275 after the host device programs the fuse array six (6) times, or the like.

In some embodiments, the predetermined signal may be a sequence of commands (e.g., a combination of two read commands, one write command, one command programming an MPR, and one precharge command). Also, the threshold may be one (1) or two (2) or even greater—e.g., if the lock trigger component 250 is configured to block additional access to the DFT circuit 275 after determining the sequence of commands occurring once, twice, or more. In this manner, the memory device may trigger security locks for the DFT circuit 275 based on one or more events associated with commands directed to the memory device.

Additionally, or alternatively, the access control component may trigger the security lock based on a predetermined period of time. In this regard, the access control component may prohibit access to the DFT circuit 275 based on determining that a predetermined period has expired after one or more occurrences of the predetermined signals that the access control component detected. The access control component may monitor, via a signal 255, inputs related to the predetermined periods of time such that the lock trigger component 250 can generate the signal 285 to trigger (activate) the security lock for the DFT circuit 275.

In some embodiments, the access control component may count a quantity of clock cycles (e.g., external clock signals CK and/or WCK, internal clock signal ICLK described with reference to FIG. 1), via the signal 255 received at the event counter 260 of the lock trigger component 250, in response to detecting the predetermined signal (e.g., a command accessing the NVM elements, a command programming the mode register, etc.). Further, the access control component may, in conjunction with the comparator 270, compare the quantity of clock cycles to the threshold 265, where the threshold 265 corresponds to the predetermined period— e.g., the threshold predetermined to be a certain quantity of clock cycles representing a period of time for the lock trigger component 250 to wait after the instance of the predetermined signal.

In other embodiments, the access control component may monitor an internal counter of the memory device, via the signal 255 received at the event counter 260, in response to detecting the predetermined signal. The internal counter may be configured to count a quantity of commands (e.g., refresh commands) periodically executed to a memory array of the memory device. Such periodic operations are associated with a fixed cycle time to complete and the internal counter may track counts of the commands (e.g., refresh operations) that has been executed to the memory device. As such, a value of the internal counter may indicate a quantity of such operations (e.g., refresh operations) and correspond to a fixed period of time. In some embodiments, the registers (e.g., the register 118 described with reference to FIG. 1) of the memory device includes the internal counter. Further, the access control component may, in conjunction with the comparator 270, determine that the internal counter has exceeded the threshold 265, where the threshold corresponds to the predetermined period—e.g., the threshold predetermined to be a certain quantity of the refresh commands representing a period of time for the lock trigger component 250 to wait after the instance of the predetermined signal.

Additionally, or alternatively, the access control component may trigger the security lock based on an external signal received at a pin of the memory device—e.g., an external signal asserted by a host device coupled with the memory device. The lock trigger component 250 may monitor the external signal, via the signal 255. For example, the predetermined signal may correspond to a voltage level of a dedicated pin of the memory device, which has been asserted by the host device. Further, the access control component may determine, in response to detecting the predetermined signal, that the voltage level satisfies a threshold stored in the memory device. Accordingly, the threshold may correspond to a predetermined range of voltage. In some embodiments, the host device may assert a low voltage to the pin (e.g., a voltage close to a ground potential) to indicate the memory device to trigger the security lock. In other embodiments, the host device may assert a high voltage to the pin (e.g., a voltage close to an operating voltage of the memory device) to indicate the memory device to trigger the security lock. In some embodiments, the host device may assert a combination of the low and high voltages to the pin to indicate the same.

In some embodiments, the access control component may trigger the security lock based on monitoring internal voltage sources of the memory device (e.g., the internal potential VPOP described with reference to FIG. 1). In this regard, the signal 255 may be configured to keep track of variations in voltage levels of the internal voltage sources. One of such internal voltage sources may be coupled to the DFT circuit 275 and configured to provide a voltage different than (e.g., greater than) an operating voltage of the memory device. In some cases, such a voltage source may be referred to as a super voltage (SV). For example, if the SV is deactivated, the lock trigger component 250 may determine that the voltage level of the SV (e.g., via the signal 255 received at the event counter 260) becomes less than the threshold 265 (e.g., utilizing the comparator 270). Subsequently, the lock trigger component 250 can generate the signal 285 to prohibit access to the DFT circuit 275. As such, in some embodiments, the predetermined signal corresponds to deactivating the SV coupled to the DFT circuit 275.

Figure 2B:
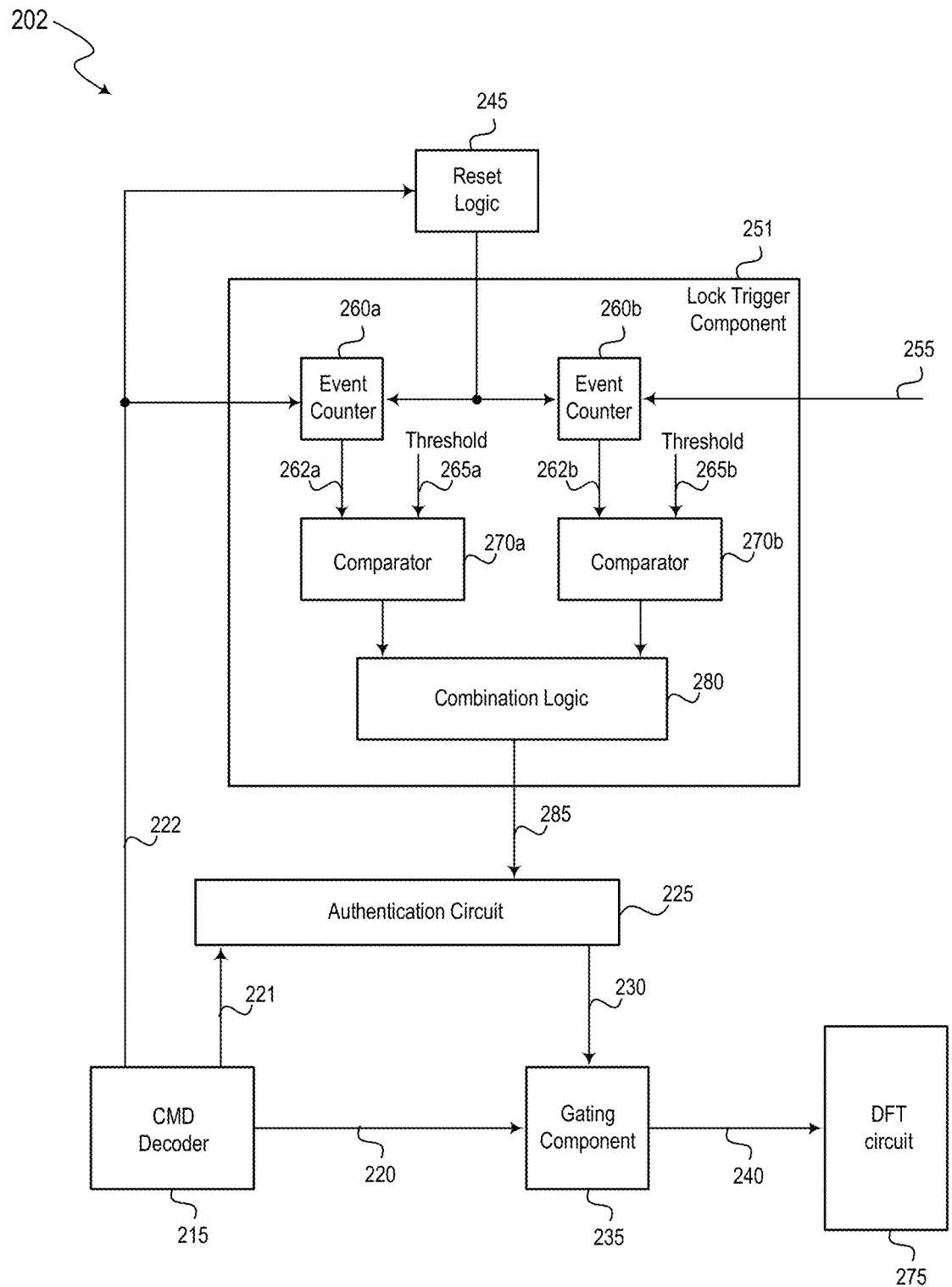

FIG. 2B is a block diagram 202 schematically illustrating an access control component (e.g., the access control component 185) of a memory device (e.g., the memory device 100), which provides security locks for secure features of the memory device in accordance with embodiments of the present technology. The access control component of the diagram 202 includes the authentication circuit 225, the gating component 235, the reset logic 245, and a lock trigger component 251 having multiple event counters 260 and multiple comparators 270. Further, the lock trigger component 251 includes a combination logic component 280. The access control component of the diagram 202 is coupled with the DFT circuit 275 and the command decoder 215. The diagram 202 illustrates a variation of the access control component described with reference to the diagram 201 of FIG. 2A. As such, descriptions directed to common aspects between the diagrams 201 and 202 are omitted for the diagram 202 to avoid duplicating the same descriptions.

The lock trigger component 251 includes multiple event counters 260 (also identified individually as 260a and 260b) and multiple comparators 270 (also identified individually as 270a and 270b). As such, the lock trigger component 251 may monitor more than one predetermined signals—e.g., command based predetermined signals using the signal 222 received at the event counter 260a and time-period based predetermined signals using the signal 255 received at the event counter 260b. Further, the lock trigger component 251 may determine that the predetermined signals satisfy the thresholds as described above with reference to FIG. 2A—e.g., using the comparator 270a and the threshold 265a for the command based predetermined signals and using the comparator 270b and the threshold 265b for the time-period based predetermined signals.

The combination logic component 280 may be configured to receive a first signal from the comparator 270a (e.g., the signal related to the quantity of instances being greater than or equal to the threshold 265a) and a second signal (e.g., the signal related to the predetermined period has expired when compared to the threshold 265b) from the comparator 270b to generate the signal 285 configured to prohibit the access to the DFT circuit 275. Further, the authentication circuit 225 receives the signal 285 (e.g., the signal to lock the secure features) from the combination logic component 280 of the lock trigger component 251.

The reset logic 245 may reset the value that tracks instances of the predetermined signal based on receiving the signal 222. Further, the reset logic 245 of the access control component of the diagram 202 may be configured to reset the event counters 260a/b in response to receiving a common command or different commands. For example, the reset logic 245 may reset both the event counters 260a/b in response to receiving a command that programs the NVM element of the memory device. In other examples, the reset logic 245 may reset the event counter 260a in response to receiving a first command (e.g., a command that programs the NVM element), and reset the event counter 260b in response to receiving a second command different than the first command (e.g., a command that reads the NVM element).

In comparison to the access control component of the diagram 201, the access control component of the diagram 202 is configured to trigger the security lock for the DFT circuit 275 by monitoring two or more predetermined signals associated with the memory device. Although in the foregoing example embodiment of the diagram 202, the access control component is illustrated and described to monitor command based predetermined signals and time-period based predetermined signals, in other embodiments, the access control component may be provided to monitor different combinations of predetermined signals. For example, the access control component may monitor any combinations of predetermined signals including command based predetermined signals, time-period based predetermined signals, external signal based predetermined signals, operating voltage level based predetermined signals, or the like.

FIGS. 3A through 3C are conceptual timing diagrams 301 through 303 illustrating security locks for memory devices (e.g., the memory device 100) based on monitoring predetermined signals directed to the memory devices in accordance with embodiments of the present technology. An access control component (e.g., the access control component 185, the access control components described with reference to FIGS. 2A and 2B) of the memory device may carry out the security lock triggering. As described above, the predetermined signals may be command based predetermined signals, time-period based predetermined signals, external signal based predetermined signals, operating voltage level based predetermined signals, or a combination thereof. Further, the commands may include a command directed to a memory array of the memory device, a command directed to the peripheral circuitry, a command directed to a register of the memory device, or a combination thereof.

The diagram 301 of FIG. 3A illustrates a security lock triggering scheme based on monitoring a quantity of one or more instances of the predetermined signals. For example, at time $T_A$, accessing a DFT circuit (e.g., the DFT circuit 175, 275) of the memory device may be allowed—e.g., upon successfully completing an initialization procedure after powering up the memory device. Thereafter, the access control component of the memory device (e.g., the access control component 185) may detect one or more predetermined signals directed to the memory device as described above with reference to FIGS. 2A and 2B. The diagram 301 depicts three (3) such signals (e.g., programming an NVM element of the memory device under the test mode) occurring at times T1, T2, and T3. Subsequently, at time $T_L$, the access control component prohibits accessing the DFT circuit (e.g., lock the secure features) upon determining that the predetermined signals have satisfied a threshold (e.g., programming the NVM element three (3) times). In some embodiments, a power cycle is necessary to access the DFT circuit, again.

The diagram 302 of FIG. 3B illustrates a security lock triggering scheme based on monitoring a fixed time period (e.g., counting down) after detecting a predetermined signal. For example, at time $T_A$, accessing the DFT circuit of the memory device may be allowed. At time T1, the access control component detects a first predetermined signal (e.g., programming the NVM element first time) and the access control component may start monitoring a first time duration D1 that expires at time T3. The diagram 302 illustrates that, before the first time duration D1 expires, a second predetermined signal (e.g., programming the NVM element second time) occurs at time T2. In response to detecting the second predetermined signal, the access control component starts monitoring a second time duration D2 that expires at time T4. In this manner, the time duration, during which accessing the secure features is allowed, can be extended so long as a predetermined event occurs within a fixed time duration (e.g., D1, D2)—e.g., a qualifying command to extend (or renew) the fixed time duration is executed. Subsequently, the access control component may determine that the second time duration D2 expires at time T4 without any additional predetermined signal detected for the memory device. Thereafter, at time $T_L$, the access control component prohibits accessing the DFT circuit upon determining that the second time duration D2 has expired at time T4. In some embodiments, a power cycle is necessary to access the DFT circuit, again. In some embodiments, the reset logic 245 described with reference to FIGS. 2A and 2B may reset a counter of the access control component (e.g., the event counter 260) in response to detecting one or more predetermined signals (e.g., one or more commands programming the NVM element) such that the time duration can be extended.

As such, while the access to the secure features is allowed (e.g., at time $T_A$), the access control component allows accessing the DFT circuit during a fixed time period after detecting a predetermined signal—e.g., regardless of a quantity of accessing the secure features. Further, if another predetermined signal is detected (e.g., a qualifying command to extend (or renew) the fixed time duration is executed) before the fixed time period expires, the time period is reset—e.g., counting down starts anew to extend the time period. So long as at least a predetermined signal occurs (e.g., a qualifying command is executed) within the fixed time period following each predetermined signal, the security lock may not be triggered. In some cases, this scheme of controlling the access to the secure features (or secure functions) may be referred to as a persistent countdown scheme.

The diagram 303 of FIG. 3C illustrates a security lock triggering scheme based on detecting the one or more predetermined signals, after allowing access to the DFT circuit at time $T_A$ based on successfully authenticating access keys accompanying access commands directed to the DFT circuit. Once the access to the secure features is allowed (e.g., opening a door to the DFT circuit), the access control component may monitor the predetermined signals as described above. Further, the access control component may utilize the persistent countdown scheme while monitoring the predetermined signals to trigger the security lock. For example, the diagram 303 illustrates, after the time $T_A$, the access control component detects the predetermined signals occurring at times T1 and T2. Thereafter, at time $T_L$, the access control component prohibits accessing the DFT circuit upon determining that detecting the one or more predetermined signals has satisfied the threshold. In some embodiments, a power cycle is necessary to access the DFT circuit utilizing the access key based entries to the test modes (e.g., the DFT circuit), again.

Figure 4A:
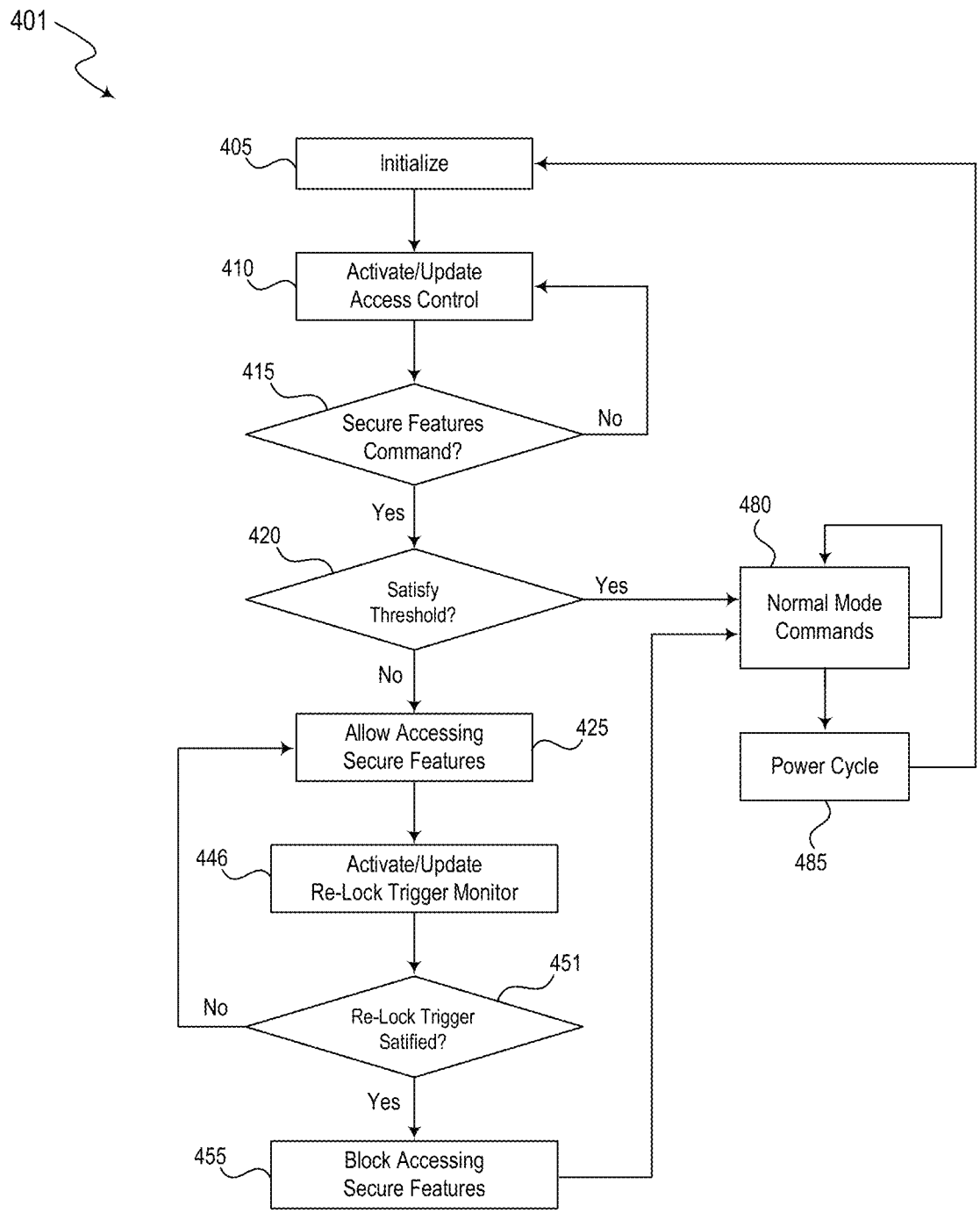
FIGS. 4A through 4C are flowcharts illustrating security locks for memory devices in accordance with embodiments of the present technology.
Figure 4B:
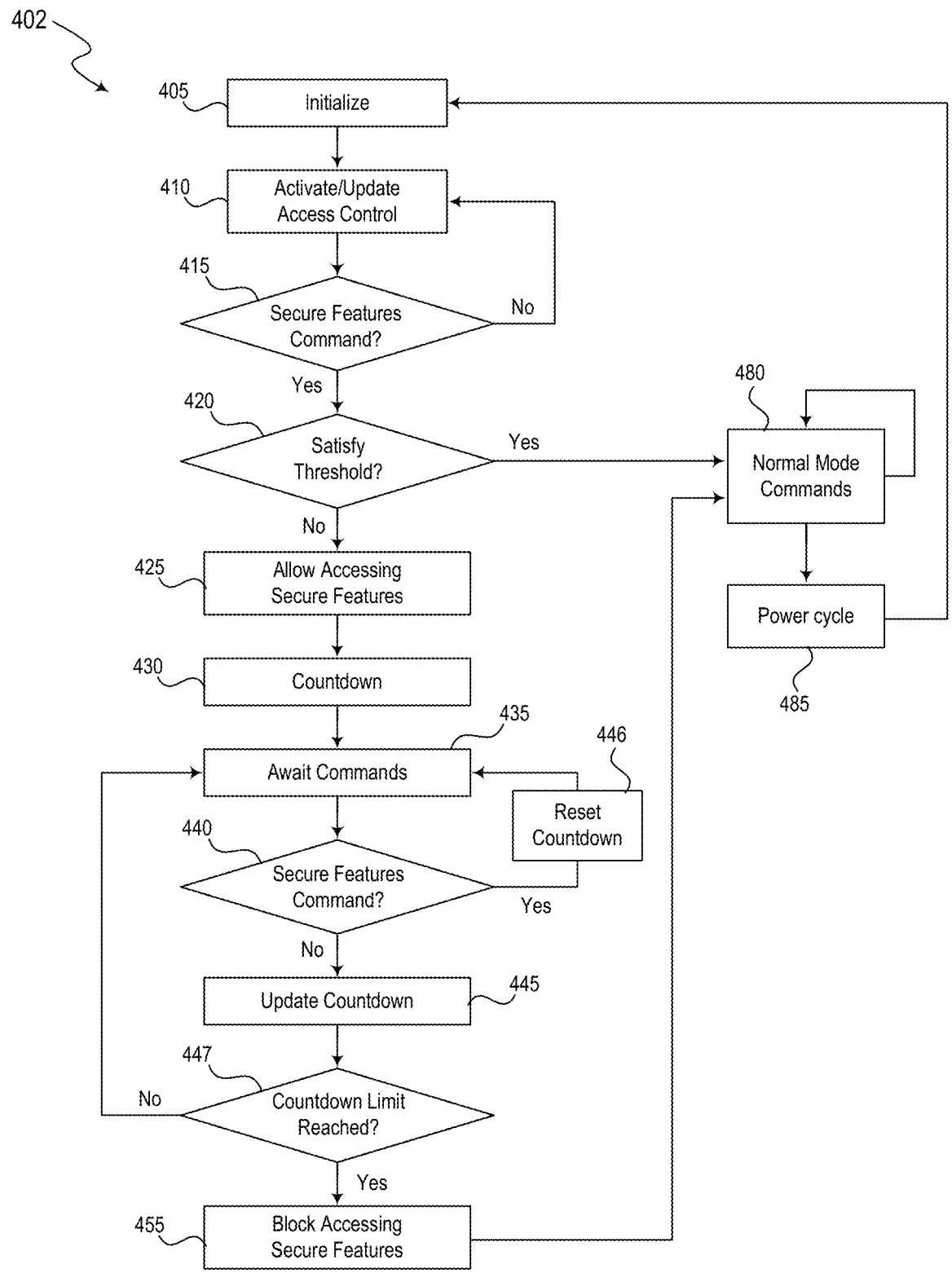
Figure 4C:
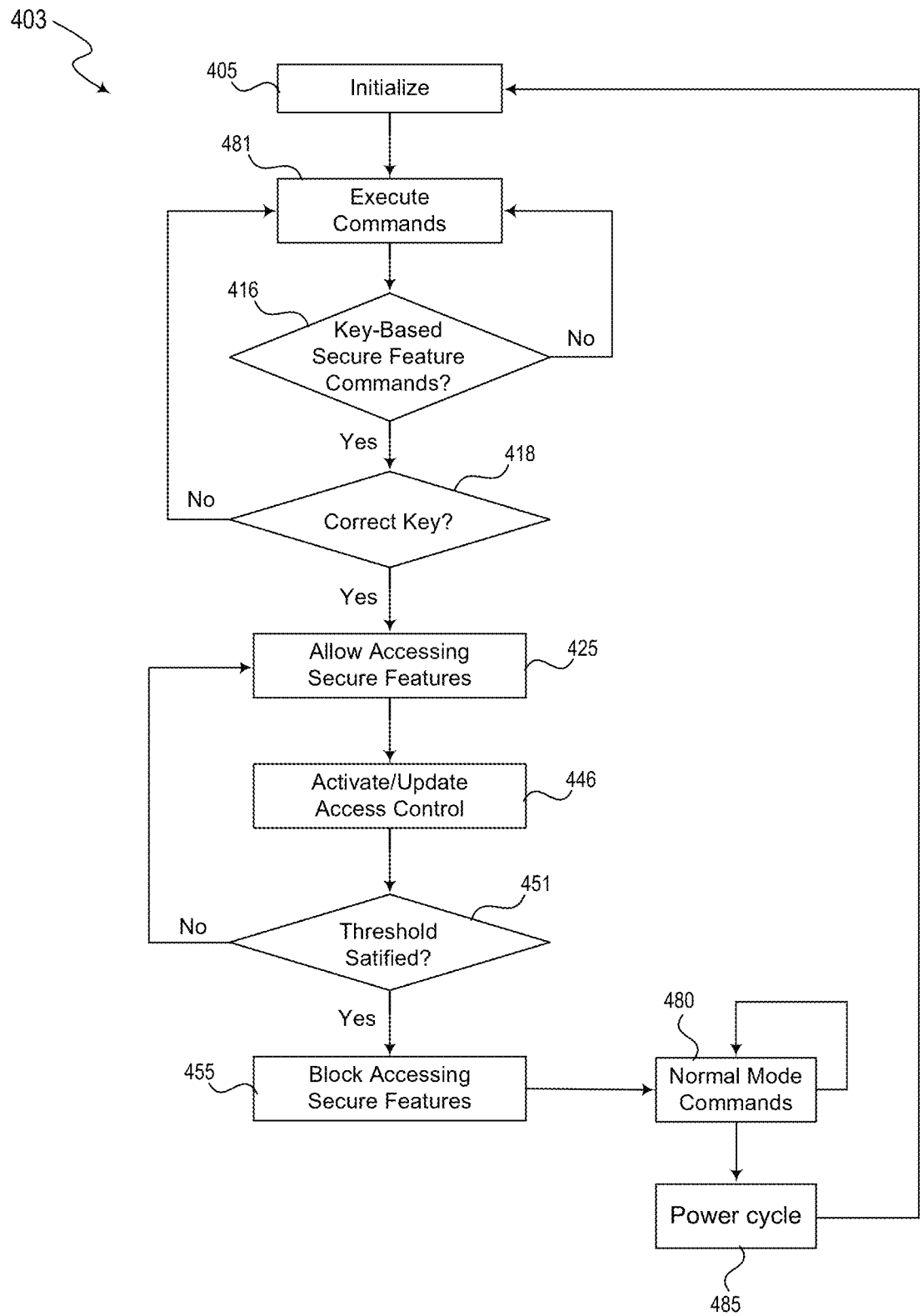

FIGS. 4A through 4C are flowcharts 401-403 illustrating aspects of security locks for memory devices (e.g., the memory device 100) based on detecting predetermined signals in accordance with embodiments of the present technology. The flowcharts 401-403 may be regarded as including aspects of state diagrams of the memory device. An access control component (e.g., the access control component 185, the access control components described with reference to FIGS. 2A and 2B) of the memory device may carry out the security lock triggering. As described above, the predetermined signals may be command based predetermined signals, time-period based predetermined signals, external signal based predetermined signals, operating voltage level based predetermined signals, or a combination thereof. Further, the commands may include a command directed to a memory array of the memory device, a command directed to the peripheral circuitry, a command directed to a register of the memory device, or a combination thereof.

The flowchart 401 may illustrate aspects of triggering the security lock as described with reference to FIG. 3A. At box 405, the memory device may be initialized, e.g., after powering up the memory device. At box 410, an access control component (e.g., the access control component 185) of the memory device may be activated. At box 415, the memory device determines whether a command directed to the memory device (e.g., in conjunction with the command decoder 215) accesses test mode functions—e.g., the secure features and/or functions the DFT circuit performs. If the command is a normal mode command (e.g., not accessing the secure features), the memory device may update a counter of the access control component (e.g., update the event counter 260 of the access control component).

If the command is directed to the secure features, the memory device may determine, at box 420 whether a threshold for one or more predetermined signals is satisfied. If the threshold has been satisfied, the memory device prohibits the command accessing the secure features. Thereafter, the memory device carries out the normal mode commands as indicated by box 480. If the threshold has not been satisfied, the memory device allows the command accessing the secure features at box 425. At box 446, the memory device updates the access control component (e.g., the event counter 260 of the access control component), as a result of allowing access to the secure features. At box 451, the memory device determines whether the threshold for the predetermined signals is satisfied. If the threshold is not satisfied, at box 425, the memory device allows subsequent access to the secure features. If the threshold is satisfied, at box 455, the memory device prohibits further access to the secure features. Subsequently, the memory device carries out the normal mode commands as indicated by box 480. In some embodiments, a power cycle at box 485 is necessary to re-initialize the memory device—e.g., at box 405.

The flowchart 402 may illustrate aspects of triggering the security lock as described with reference to FIG. 3B—e.g., the persistent countdown scheme. Operations corresponding to boxes 405 through 425 have been described with reference to the flowchart 401 and are not repeated. At box 430, the memory device starts counting down (e.g., start monitoring the time duration D1) after allowing a first command (e.g., the first predetermined signal at time T1 of the diagram 302) to access the secure features at box 425. At box 435, the memory device may await other commands while the access to the secure features remains open until the countdown expires. At box 440, the memory device may determine that a second command accessing the secure features is carried out (e.g., the second predetermined signal at time T2 of the diagram 302). Subsequently, at box 446, the memory device resets counting down (e.g., start monitoring the time duration D2 starting from time T2), and at box 435, the memory device continues to await other commands while the access to the secure features remains open until the time duration D2 expires. Alternatively, at box 440, if the memory device does not execute a command directed to the secure features (e.g., the predetermined signal is not detected), the memory device continues counting down at box 445. At box 447, the memory device may determine whether the time duration (e.g., the time duration D1 or D2) expires (e.g., the countdown limit is reached). If the countdown limit is reached, at box 455, the memory device prohibits further access to the secure features. Alternatively, at box 447, if the time duration has not expired (e.g., the countdown limit is not reached), the memory device may continue to wait for another command while the access to the secure features remains open. Although the flowchart 402 refers to commands accessing the secure features to illustrate details of the persistent countdown scheme, the present technology is not limited thereto. For example, other commands (e.g., read/write commands, precharge/activate commands, etc.) may be used to implement the persistent countdown scheme.

The flowchart 403 may illustrate aspects of triggering the security lock as described with reference to FIG. 3C. At box 405, the memory device may be initialized, after powering up the memory device. Upon completing the initialization, the secure features of the memory device may be blocked. At box 481, the memory device performs various commands upon successfully initialization. At 416, the memory device determines whether commands are normal mode commands not accessing the secure features or commands requiring access to the secure features. The commands requiring access to the secure features may accompany access keys. If the memory device determines that the commands requires accessing the secure features, at box 418, the memory device may determine whether the access keys accompanying the commands are authentic or not. If the memory device determines that the access keys are not authentic (or otherwise invalid), the memory device prohibits the commands accessing the secure features. Subsequently, the memory device may continue to perform various commands (e.g., normal mode commands). Alternatively, if the memory device determines that the memory device is authentic, the memory device allows the command to access the secure features at box 425.

Also, at box 446, the memory device activates (or updates) the access control component such that the memory device can detect the predetermined signals directed to the memory device to trigger the security lock if the predetermined signals satisfy the threshold. At box 451, the memory device may determine whether the predetermined signals satisfy the threshold or not. If the threshold has been satisfied, at box 455, the memory device prohibits further access to the secure features. Alternatively, at box 451, the memory device may determine that the predetermined signals have not satisfied the threshold. Subsequently, the memory device allows commands to access the secure features, until the predetermined signals satisfies the threshold. Once the memory device blocks accessing secure features at box 455, the memory device performs normal mode operations at 480. In some embodiments, a power cycle at box 485 is necessary to re-initialize the memory device— e.g., at box 405.

Figure 5:
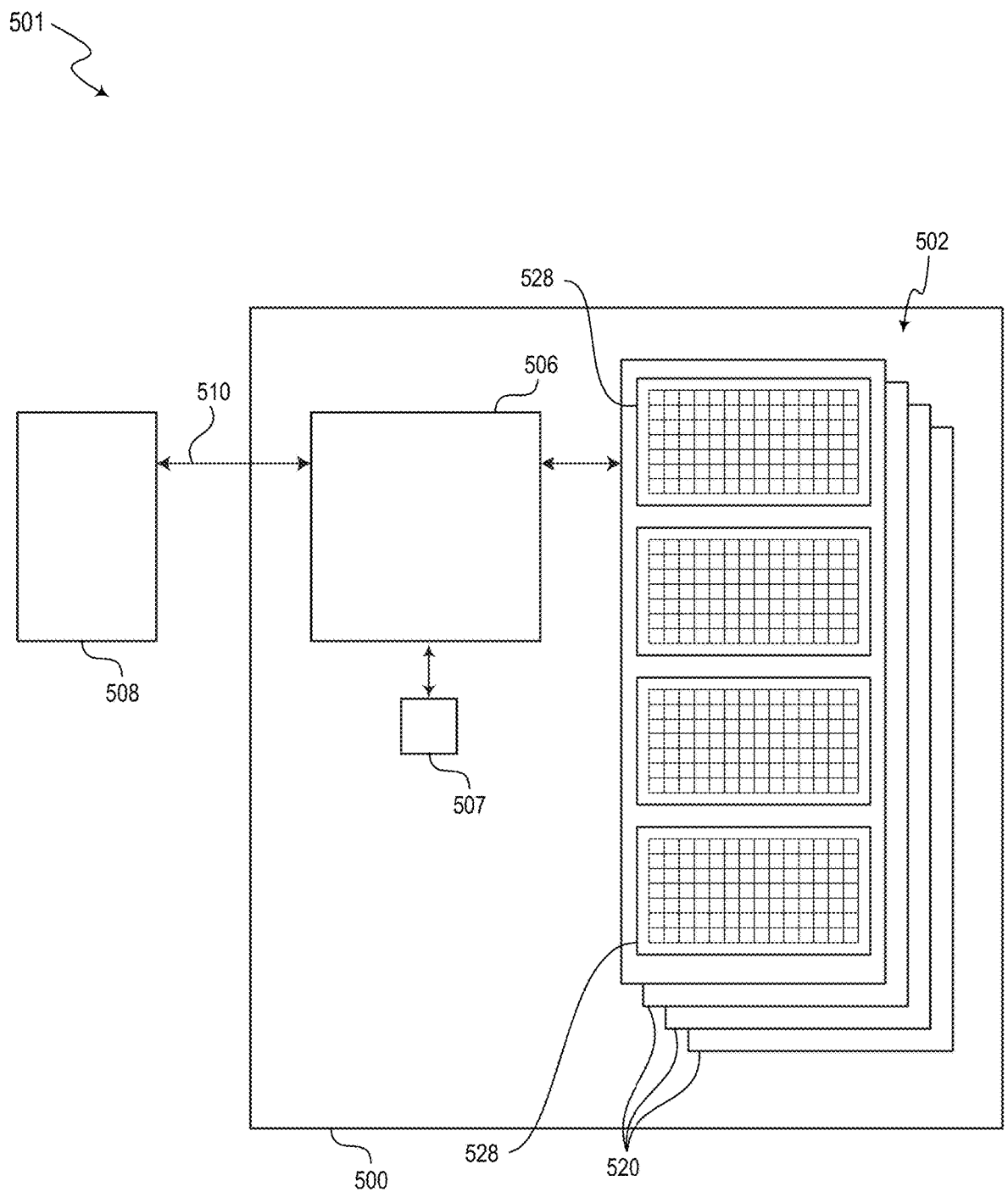
FIG. 5 is a block diagram schematically illustrating a memory system in accordance with an embodiment of the present technology.

FIG. 5 is a block diagram schematically illustrating a memory system 501 in accordance with an embodiment of the present technology. The memory system 501 includes a memory device 500, which may be an example of or include aspects of the memory device 100 described with reference to FIG. 1. As shown, the memory device 500 includes a main memory 502 (e.g., DRAM, NAND flash, NOR flash, FeRAM, PCM, etc.) and control circuitry 506 operably coupled to a host device 508 (e.g., an upstream central processing unit (CPU)). The main memory 502 may be an example of or include aspects of the memory array 150 described with reference to FIG. 1. The control circuitry 506 include aspects of various components described with reference to FIGS. 1 through 2B. For example, the control circuitry 506 may include aspects of the access control component 185. Further, the memory device 500 includes a DFT circuit 507, which may be an example of or include aspects of the DFT circuit 175, 275 described with reference to FIGS. 1 and 2.

The main memory 502 includes a plurality of memory units 520, which each include a plurality of memory cells. The memory units 520 can be individual memory dies, memory planes in a single memory die, a stack of memory dies vertically connected with through-silicon vias (TSVs), or the like. For example, in one embodiment, each of the memory units 520 can be formed from a semiconductor die and arranged with other memory unit dies in a single device package. In other embodiments, multiple memory units 520 can be co-located on a single die and/or distributed across multiple device packages. The memory units 520 may, in some embodiments, also be sub-divided into memory regions 528 (e.g., banks, ranks, channels, blocks, pages, etc.).

The memory cells can include, for example, floating gate, charge trap, phase change, capacitive, ferroelectric, magnetoresistive, and/or other suitable storage elements configured to store data persistently or semi-persistently. The main memory 502 and/or the individual memory units 520 can also include other circuit components, such as multiplexers, decoders, buffers, read/write drivers, address registers, data out/data in registers, etc., for accessing and/or programming (e.g., writing) the memory cells and other functions, such as for processing information and/or communicating with the control circuitry 506 or the host device 508. Although shown in the illustrated embodiments with a certain number of memory cells, rows, columns, regions, and memory units for purposes of illustration, the number of memory cells, rows, columns, regions, and memory units can vary, and can, in other embodiments, be larger or smaller in scale than shown in the illustrated examples. For example, in some embodiments, the memory device 500 can include only one memory unit 520. Alternatively, the memory device 500 can include two, three, four, eight, ten, or more (e.g., 16, 32, 64, or more) memory units 520. Although the memory units 520 are shown in FIG. 5 as including four memory regions 528 each, in other embodiments, each memory unit 520 can include one, two, three, eight, or more (e.g., 16, 32, 64, 100, 128, 256, or more) memory regions.

In one embodiment, the control circuitry 506 can be provided on the same die as the main memory 502 (e.g., including command/address/clock input circuitry, decoders, voltage and timing generators, input/output circuitry, etc.). In another embodiment, the control circuitry 506 can be a microcontroller, special purpose logic circuitry (e.g., a field programmable gate array (FPGA), an application specific integrated circuit (ASIC), control circuitry on a memory die, etc.), or other suitable processor. In one embodiment, the control circuitry 506 can include a processor configured to execute instructions stored in memory to perform various processes, logic flows, and routines for controlling operation of the memory device 500, including managing the main memory 502 and handling communications between the memory device 500 and the host device 508. In some embodiments, the control circuitry 506 can include embedded memory with memory registers for storing, e.g., row counters, bank counters, memory pointers, fetched data, etc. In another embodiment of the present technology, a memory device 500 may not include control circuitry, and may instead rely upon external control (e.g., provided by the host device 508, or by a processor or controller separate from the memory device 500).

The host device 508 can be any one of a number of electronic devices capable of utilizing memory for the temporary or persistent storage of information, or a component thereof. For example, the host device 508 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device 508 may be a networking device (e.g., a switch, a router, etc.) or a recorder of digital images, audio and/or video, a vehicle, an appliance, a toy, or any one of a number of other products. In one embodiment, the host device 508 may be connected directly to memory device 500, although in other embodiments, the host device 508 may be indirectly connected to memory device (e.g., over a networked connection or through intermediary devices).

In operation, the control circuitry 506 can directly write or otherwise program (e.g., erase) the various memory regions of the main memory 502. The control circuitry 506 communicates with the host device 508 over a host-device bus or interface 510. In some embodiments, the host device 508 and the control circuitry 506 can communicate over a dedicated memory bus (e.g., a DRAM bus). In other embodiments, the host device 508 and the control circuitry 506 can communicate over a serial interface, such as a serial attached SCSI (SAS), a serial AT attachment (SATA) interface, a peripheral component interconnect express (PCIe), or other suitable interface (e.g., a parallel interface). The host device 508 can send various requests (in the form of, e.g., a packet or stream of packets) to the control circuitry 506. A request can include a command to read, write, erase, return information, and/or to perform a particular operation (e.g., a refresh operation, a TRIM operation, a precharge operation, an activate operation, a wear-leveling operation, a garbage collection operation, etc.).

In some cases, the memory device 500 may detect a predetermined signal directed to the memory device 500, where the predetermined signal includes one or more commands directed to the memory device and/or an operating parameter of the memory device. The memory device 500 may determine that the predetermined signal satisfies a threshold stored in the memory device 500. Further, the memory device 500 may prohibit access to the DFT circuit 507 based on the determination, where the DFT circuit 507 is configured to perform test mode functions of the memory device 500. In some embodiments, the memory device 500 stores a quantity of one or more instances of the predetermined signal in the memory device 500 based on detecting the predetermined signal. Further, the memory device 500 may compare the quantity of one or more instances with the threshold, where prohibiting access to the DFT circuit 507 is based on the quantity being greater than or equal to the threshold.

Figure 6:
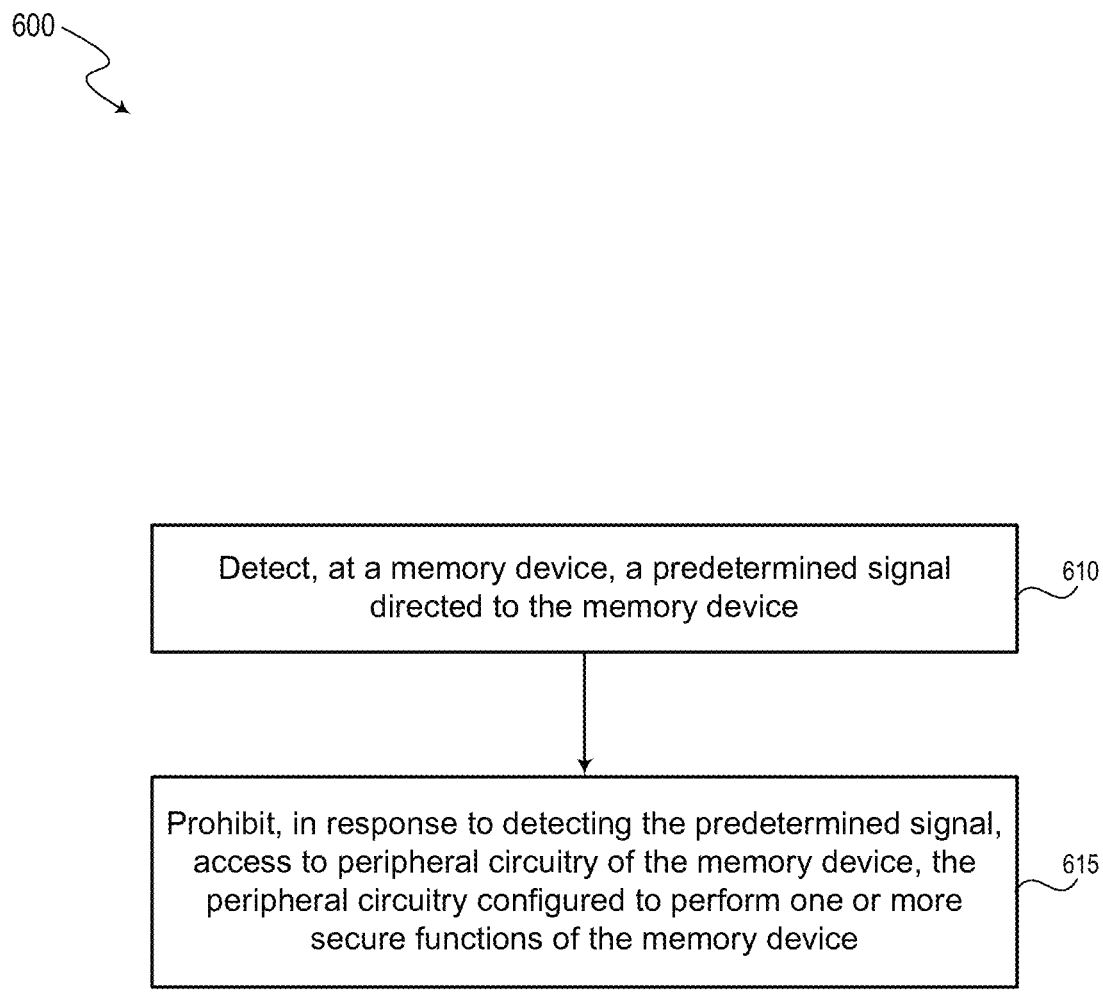
FIG. 6 is a flow chart illustrating methods of operating a memory device in accordance with embodiments of the present technology.

FIG. 6 is a flowchart 600 illustrating a method of operating a memory device in accordance with an embodiment of the present technology. The flowchart 600 may be an example of or include aspects of a method that the memory device 100, 500 (e.g., the access control component 185, the control circuitry 506) may perform as described with reference to FIGS. 1 through 5.

The method includes detecting, at the memory device, a predetermined signal directed to the memory device (box 610). In accordance with one aspect of the present technology, the detecting feature of box 610 can be performed by the access control component as described with reference to FIGS. 1 through 5.

The method further includes prohibiting, in response to detecting the predetermined signal, access to peripheral circuitry of the memory device, the peripheral circuitry configured to perform one or more secure functions of the memory device (box 615). In accordance with one aspect of the present technology, the prohibiting feature of box 615 can be performed by the access control component as described with reference to FIGS. 1 through 5.

In some embodiments, the method can further include updating a counter of the memory device in response to detecting the predetermined signal. In some embodiments, the method can further include comparing a value of the counter with a threshold stored in the memory device, where prohibiting access to the peripheral circuitry is based on the value of the counter satisfying the threshold. In some embodiments, the predetermined signal corresponds to one or more commands including a command directed to a memory array of the memory device, a command directed to the peripheral circuitry, a command directed to a register of the memory device, or a combination thereof.

In some embodiments, the method can further include determining, in response to detecting the predetermined signal, that a predetermined period has expired, where prohibiting access to the peripheral circuitry is based on the determination. In some embodiments, determining that the predetermined period has expired includes counting a quantity of clock cycles in response to detecting the predetermined signal, and comparing the quantity of clock cycles to a threshold stored in the memory device, the threshold corresponding to the predetermined period. In some embodiments, determining that the predetermined period has expired includes monitoring an internal counter of the memory device in response to detecting the predetermined signal, the internal counter configured to count a quantity of commands periodically executed to a memory array of the memory device, and determining that the internal counter has exceeded a threshold stored in the memory device, the threshold corresponding to the predetermined period.

In some embodiments, the predetermined signal corresponds to a voltage level of a dedicated pin of the memory device, the voltage level asserted by a host device coupled with the memory device. In some embodiments, the method can further include determining, in response to detecting the predetermined signal, that the voltage level satisfies a threshold stored in the memory device, the threshold corresponding to a predetermined range of voltage. In some embodiments, the predetermined signal corresponds to deactivating an internal voltage source of the memory device, the internal voltage source coupled to the peripheral circuitry and configured to generate a voltage greater than an operating voltage of the memory device.

In some embodiments, the predetermined signal corresponds to a first command directed to the peripheral circuitry, and the method can further include monitoring for a second command directed to the peripheral circuitry during first predetermined duration after the first command is executed. In some embodiments, the method can further include determining that the first predetermined duration has expired without the second command, where prohibiting access to the peripheral circuitry is based on the determination. In some embodiments, the method can further include determining that the second command is executed during the first predetermined duration, and monitoring for a third command directed to the peripheral circuitry during second predetermined duration after the second command is executed.

It should be noted that the methods described above describe possible implementations, and that the operations and the steps may be rearranged or otherwise modified and that other implementations are possible. Furthermore, embodiments from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The devices discussed herein, including a memory device, may be formed on a semiconductor substrate or die, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. A method, comprising:
    detecting, at a memory device, a predetermined signal directed to the memory device; and
    prohibiting, in response to detecting the predetermined signal, access to peripheral circuitry of the memory device, the peripheral circuitry configured to perform one or more secure functions of the memory device,
    updating a counter of the memory device in response to detecting the predetermined signal, and
    comparing a value of the counter with a threshold stored in the memory device,
    wherein prohibiting access to the peripheral circuitry is based on the value of the counter satisfying the threshold.

2. The method of claim 1, wherein the predetermined signal corresponds to one or more commands including a command directed to a memory array of the memory device, a command directed to the peripheral circuitry, a command directed to a register of the memory device, or a combination thereof.

3. The method of claim 1, further comprising:
    determining, in response to detecting the predetermined signal, that a predetermined period has expired, wherein prohibiting access to the peripheral circuitry is based on the determining.

4. The method of claim 3, wherein determining that the predetermined period has expired includes counting a quantity of clock cycles in response to detecting the predetermined signal and wherein the comparing includes comparing the quantity of the clock cycles to the threshold stored in the memory device, the threshold corresponding to the predetermined period.

5. The method of claim 3, wherein determining that the predetermined period has expired includes monitoring the counter of the memory device in response to detecting the predetermined signal, the counter configured to count a quantity of commands periodically executed to a memory array of the memory device, and
    wherein the comparing includes determining that the counter has exceeded the threshold stored in the memory device, the threshold corresponding to the predetermined period.

6. The method of claim 1, wherein the predetermined signal corresponds to deactivating an internal voltage source of the memory device, the internal voltage source coupled to the peripheral circuitry and configured to generate a voltage greater than an operating voltage of the memory device.

7. A method, comprising:
    detecting, at a memory device, a predetermined signal directed to the memory device;
    prohibiting, in response to detecting the predetermined signal, access to peripheral circuitry of the memory device, the peripheral circuitry configured to perform one or more secure functions of the memory device, wherein the predetermined signal corresponds to a voltage level of a dedicated pin of the memory device, the voltage level asserted by a host device coupled with the memory device; and
    determining, in response to detecting the predetermined signal, that the voltage level satisfies a threshold stored in the memory device, the threshold corresponding to a predetermined range of voltage.

8. A method, comprising:
    detecting, at a memory device, a predetermined signal directed to the memory device;
    prohibiting, in response to detecting the predetermined signal, access to peripheral circuitry of the memory device, the peripheral circuitry configured to perform one or more secure functions of the memory device, wherein the predetermined signal corresponds to a first command directed to the peripheral circuitry;
    monitoring for a second command directed to the peripheral circuitry during first predetermined duration after the first command is executed; and
    determining that the first predetermined duration has expired without the second command, wherein prohibiting access to the peripheral circuitry is based on the determining.

9. A method, comprising:
    detecting, at a memory device, a predetermined signal directed to the memory device;
    prohibiting, in response to detecting the predetermined signal, access to peripheral circuitry of the memory device, the peripheral circuitry configured to perform one or more secure functions of the memory device, wherein the predetermined signal corresponds to a first command directed to the peripheral circuitry;
    monitoring for a second command directed to the peripheral circuitry during first predetermined duration after the first command is executed;
    determining that the second command is executed during the first predetermined duration; and
    monitoring for a third command directed to the peripheral circuitry during second predetermined duration after the second command is executed.

10. A system, comprising:
    a host device coupled with a memory device, wherein:
        the host device is configured to:
            assert a voltage
            level to a dedicated pin of the memory device; and
        the memory device is configured to:
            detect a predetermined signal directed to the memory device; and
            prohibit, in response to detecting the predetermined signal, access to a peripheral circuitry of the memory device, the peripheral circuitry configured to perform one or more secure functions of the memory device,
            wherein the predetermined signal corresponds to the voltage level of the dedicated pin of the memory device, and, wherein, in response to detecting the predetermined signal, determining that the -voltage level satisfies a threshold stored in the memory device, the threshold corresponding to a predetermined range of voltage.

* * * * *